Dec. 14, 1965 D. E. LAWSON Re. 25,943
FOAM PLASTIC ARTICLE OF FURNITURE
Original Filed Oct. 25, 1960 3 Sheets-Sheet 1
Fig. 1.
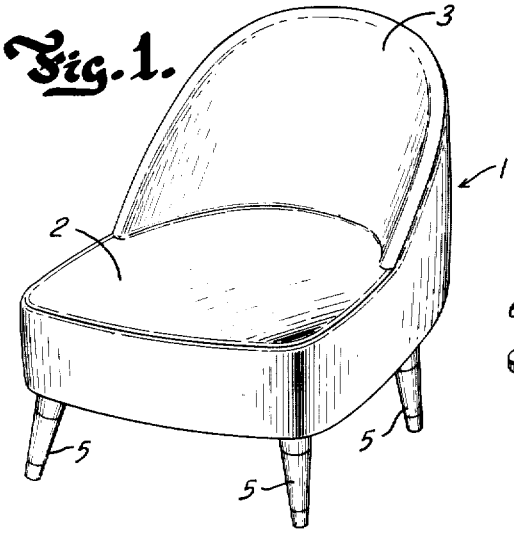
Fig. 2.
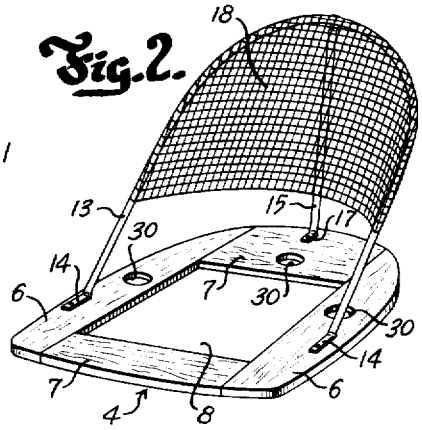
Fig. 4.
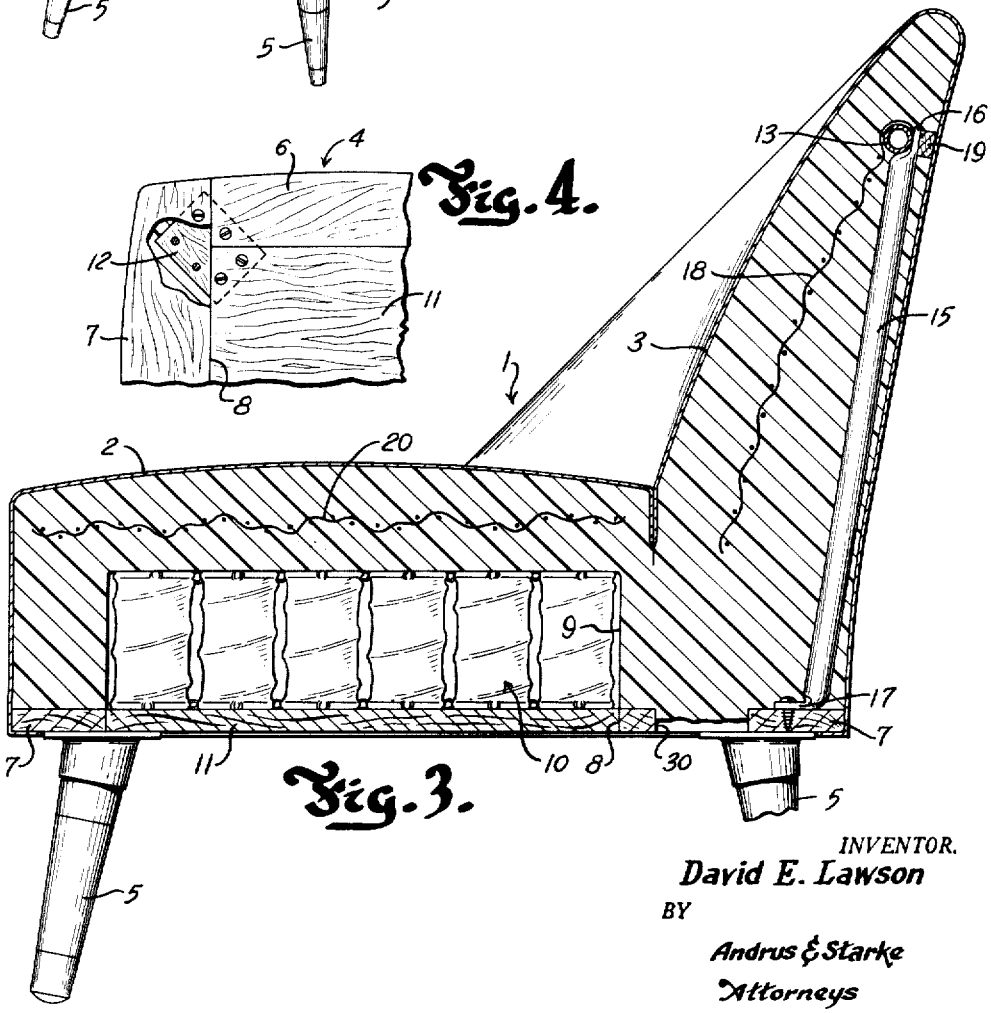
Fig. 3.
INVENTOR.
David E. Lawson
BY
Andrus & Starke
Attorneys

FOAM PLASTIC ARTICLE OF FURNITURE

Original Filed Oct. 25, 1960 3 Sheets-Sheet 2

INVENTOR.
David E. Lawson
BY
Andrus & Starke
Attorneys

FOAM PLASTIC ARTICLE OF FURNITURE

Original Filed Oct. 25, 1960 3 Sheets-Sheet 3

INVENTOR.
David E. Lawson
BY
Andrus & Starke
Attorneys

United States Patent Office

Re. 25,943
Reissued Dec. 14, 1965

25,943

FOAM PLASTIC ARTICLE OF FURNITURE

David E. Lawson, 553 McIntyre Lane, Maumee, Ohio

Original No. 3,084,980, dated Apr. 9, 1963, Ser. No. 64,945, Oct. 25, 1960. Application for reissue Mar. 10, 1964, Ser. No. 358,679
9 Claims. (Cl. 297—455)

Matter enclosed in heavy brackets [ ] appears in the original patent but forms no part of this reissue specification; matter printed in italics indicates the additions made by reissue.

This invention relates to [an article of furniture] *a load supporting structure* and more particularly to a chair or other article of furniture formed of reinforced molded foam plastic.

In the conventional method of fabricating a quality chair, a series of individual coil springs are placed on a tape webbing base and stitched thereto and a second layer of tape is placed across the top of the springs and stitched to the springs. The springs are then located on a hardwood frame and successive layers of felt, rubberized hair and foam rubber are applied over the springs. The foam rubber layer is provided with a muslin border which is tacked to the wooden frame. A layer of cotton is then placed over the foam rubber and the upholstery is fitted over these layers. This type of construction requires a number of different materials and consists largely of manual operations which substantially increase the cost and time of fabrication.

The present invention is directed to an article of furniture or chair which is fabricated in a single molding operation. More specifically, the chair comprises a seat and back which are formed of molded foam plastic and are supported on a base having a central opening. The lower surface of the foam plastic seat is provided with a central cavity which is in alignment with the opening in the base and receives a standard coil spring unit which is held within the cavity by a bottom plate.

The foam plastic back is reinforced by a generally U-shaped member which is connected to the sides of the base, and an open mesh material is secured across the U-member and serves to distribute the load applied to the back of the chair.

With the present invention, the entire unit is made in a single molded operation which eliminates most of the manual steps which are required in the normal chair fabrication. The seat and back both have excellent seating characteristics, for the foam plastic provides a softness to the touch, while the spring unit in the seat and the wire mesh in the back serve to support the load and distribute the same.

In addition, the spring unit, which is inserted within the cavity of the seat, is freely disposed therein and can be readily removed and replaced by merely removing the bottom plate.

The chair can be either used in the molded form in which the plastic itself serves as the outer surface for the chair, or upholstery can be applied over the foam plastic material.

In a modified form of the invention, the foam plastic seat, instead of being formed with a cavity to receive a spring unit, is reinforced by a sheet of open mesh material which is embedded within the seat. Normally, the mesh is bowed upwardly in a convex shape and when a load is applied to the seat, the mesh will deform to a concave shape and will thereby function to support the load and distribute the same.

Other objects and advantages will appear in the course of the following description.

The drawings illustrate the best mode presently contemplated of carrying out the invention.

In the drawings:

FIG. 1 is a perspective view of the chair construction fabricated in accordance with the present invention;

FIG. 2 is a perspective view of the base and the reinforcing members;

FIG. 3 is a vertical section taken through the completed chair construction;

FIG. 4 is an enlarged bottom view of a portion of the seat with parts broken away in section;

Figure 5:
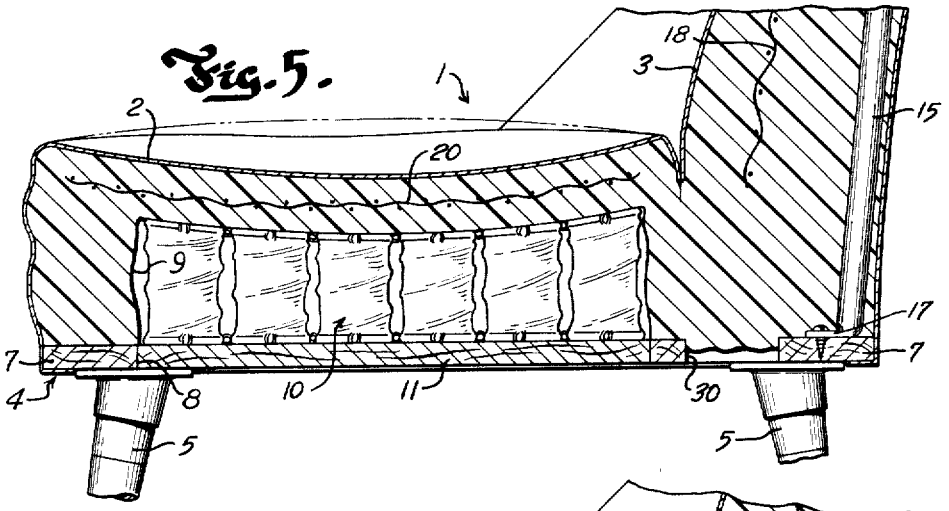
FIG. 5 is a view similar to FIG. 3 showing the seat in the compressed condition.

The drawings illustrate a chair 1 which comprises a seat 2 and a back portion 3 which are supported on a generally rectangular base 4. A plurality of legs 5 are connected to the bottom surface of the base 4 and serve to support the chair above the ground.

The base 4 is generally made of wood and includes a pair of spaced side members 6 and a pair of end members 7 which are connected together at their ends and define a central opening 8.

The seat 2 and back 3 of the chair are formed of a conventional foam plastic material, such as polyurethane, polyvinylchloride, polyethylene, polyester blends, and the like.

The use of polyurethane resin has proven very satisfactory and this resin can be prepared by reacting a polyester of adipic acid and ethylene or propylene glycol, esterified and polymerized to a molecular weight of approximately 2000, with a di-isocyanate.

The seat 2 is formed with a central cavity 9 which receives a coil spring unit 10. The spring unit itself forms no part of the present invention and is a conventional unit in which the individual coil springs are contained within muslin covers and are connected together as a unit. The spring unit 10 is retained within the cavity 9 in the seat 2 by means of a bottom plate 11 which is disposed within the opening 8. The plate 11 is secured by screws to the inwardly projecting ends of a plurality of blocks 12 which are disposed within recesses in the foam plastic seat and are secured to the upper surface of base 4, at the corners of opening 8. This is best shown in FIG. 4.

To reinforce the back 3 of the chair, a generally U-shaped member 13 is secured to the base and is embedded within the back. The U-member 13 is provided with flattened end portions 14 which are connected to the side members 6 by screws or the like. Additional support is given to the back 3 by means of a vertical support 15. The flattened upper end 16 of the support 15 is secured to the U-member 13 by suitable screws, while the lower flattened end 17 of the support is secured to the end member 7 of base 4.

To distribute the load applied to the back 3 of the chair, an open mash 18 is secured to the U-member 13. The mesh 18 may take the form of wire, fabric, netting or other materials which are flexible and will tend to distribute the load which is applied to the back of the chair.

If the chair is to be upholstered, it may be desirable to secure a wooden strip 19 to the upper portion of the U-tube 13. The wood strip 19 serves as a backing to which the upholstery can be secured.

To distribute the load applied to the seat 2, a sheet of open mesh or netting 20 is embedded within the foam plastic seat above the spring unit 10, and is generally coextensive with the seat. The mesh is bonded to the foam plastic and is disposed in a generally corrugated pattern with the mesh being arranged in a series of ridges and valleys, as shown in FIG. 3. When a load is applied to the seat, as shown in FIG. 5, the corrugations tend to straighten out and as the mesh is bonded to the foam plastic, the load is distributed throughout the entire seat area.

Figure 6:
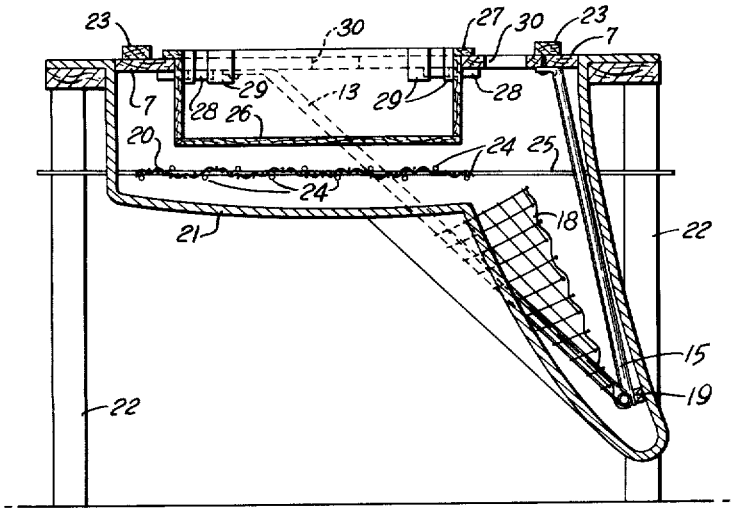
FIG. 6 is a vertical section of the mold with the reinforcement located therein.
Figure 7:
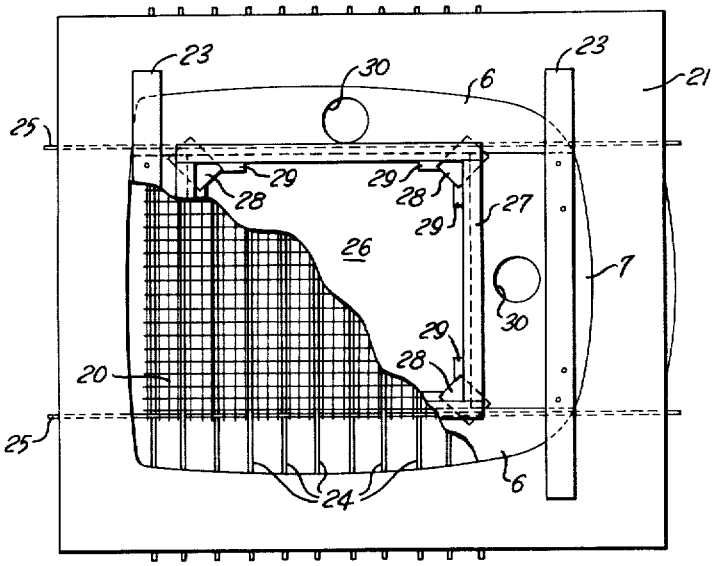
FIG. 7 is a top plan view of the mold of FIG. 6.

To fabricate the chair of the invention, the U-member 13 and vertical support 15 are initially secured to the base 4 and the mesh 18 is connected to the U-member to provide a skeleton for internal frame for the chair, as shown in FIG. 2. This frame is then inverted and placed within a mold 21, as shown in FIGS. 6 and 7. The mold 21 is supported by legs 22 and has the contour of the finished chair 1. The outer surface of the base 4 is maintained substantially flush with the upper surface of the mold by means of a pair of straps 23 which are secured to the base and rest on the upper surface of the mold to thereby suspend the skeleton framework within the mold.

The mesh 20 is supported within the mold 21 by a series of rods 24 and a pair of rods 25. The rods 24 are disposed through aligned openings in the opposite side walls of the mold and are arranged so that each alternate rod is located in a given horizontal plane while each intermediate rod is located in a second horizontal plane, as shown in FIG. 6. The mesh 20 is then passed over and under the respective rods to provide the corrugated pattern. The end rods 24 of the series are laced through the openings in the front and rear edges of the mesh so that the mesh will be retained in position on the rods 24.

Similarly, the pair of rods 25 are laced through the openings at the side edges of the mesh 20 to prevent the mesh from moving along the rods 24. The rods 24 and 25 serve to support the mesh 20 in the corrugated pattern within the mold and prevent movement of the mesh relative to the mold.

The inner surface of the mold 21 and the rods 24 and 25 are coated with a suitable releasing agent to prevent the foam plastic from adhering thereto.

The foam plastic material is then introduced in the liquid state into the mold through the central opening 8 in the base 4. When the level of the foam has risen to the position of the seat 2, a box form 26 is insetred within the opening 8 and serves to form the cavity 9 in the seat 2. The box 26 is generally rectangular shape and is provided with an outer flange 27 which rests on the outer surface of the base 4 to thereby suspend the box 26 within the mold.

To provide the recesses in the foam plastic seat which receive the box 12, a rectangular form 28 is disposed within a slot in each corner of the box 26 and projects outwardly of the respective corner, beneath the flange 27. Each form 28 is provided with a pair of angular arms 29 which engage the inner surfaces of the box on either side of the corner and serve to properly position or align the form 28 within the slot.

After the box 26 has been positioned, a plurality of filler openings 30 in the base 4 serve as vents through which the surplus foam can expand.

After curing of the foam, the rods 24 and 25 are withdrawn from the mold, and the forms 28 and box 26 are removed. In order to facilitate removal of the foam plastic chair from the mold, the mold 21 may be formed with two halves which are secured together during the molding operation.

The blocks 12 are then inserted within the recesses formed in the seat and secured to base 4. The spring unit 10 is then inserted within the cavity 9 of the seat 2 and the bottom plate 11 is attached to the projecting ends of the blocks to hold the spring unit 10 in place. Legs 5 are then attached to the base 4.

Upholstery made of fabric, leather or plastic, or a slipcover, may be disposed over the foam plastic chair 1 and *can* be readily attached to the base 4 and to the wooden strip 19 which is secured to the support member 12.

The present invention provides an [expensive] *inexpensive* and rapid method of producing a chair or other article of furniture. The reinforcing members 13 and 15 and the mesh 18 are readily secured to the wooden base 4 and this skeleton is then disposed within the mold. The chair is then formed of foam plastic in a single molding operation which eliminates the majority of the usual manual operations which are normally performed in the fabrication of a chair, sofa or the like. The chair construction provides excellent seating qualities, for the spring unit serves to support the load on the seat while the foam plastic disposed above the spring unit, provides a softness to the touch. In addition, the reinforcing members 13 and 15 and the mesh 18 serve to firmly tie the back 3 in with the seat 2 and provide a degree of flexibility for the back.

Figure 8:
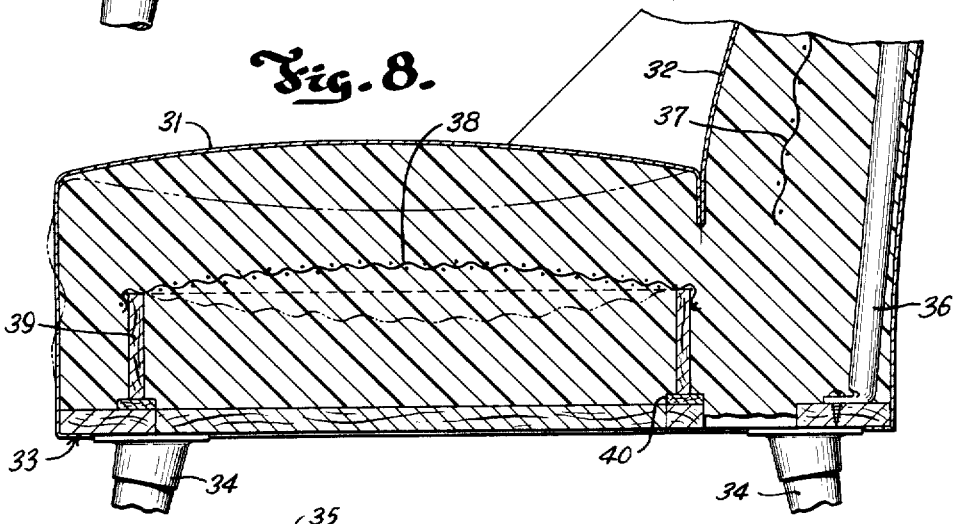
FIG. 8 is a fragmentary vertical section of a modified form of the invention.
Figure 9:
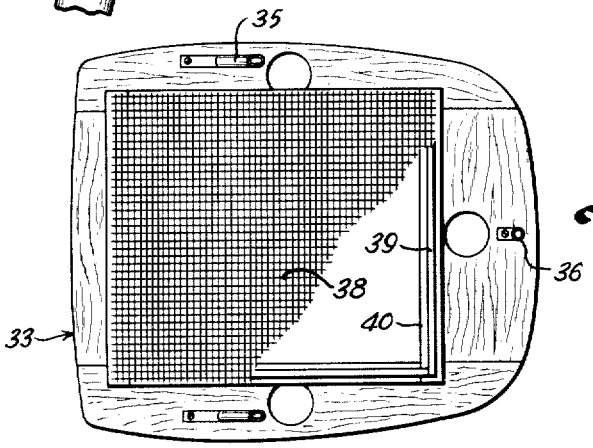
FIG. 9 is a horizontal section showing the frame construction of the chair of FIG. 8.

FIGS. 8 and 9 illustrate a modified form of the invention. In this structure the chair comprises a seat 31 and back 32 which are supported on a generally rectangular base 33 which is similar to base 4 of the first embodiment. Legs 34 are connected to the bottom surface of the base 33 and serve to support the chair.

As in the case of the first embodiment, the seat 31 and *back* 32 are formed of a foam plastic material and the back of the chair is reinforced by a generally U-shaped member 35 which is secured to the base and embedded within the back. Additional support is given to the back by means of a vertical support 36 and an open mesh 37, similar to mesh 18 of the first embodiment, is secured to the U-member 35 to distribute the load applied to the back of the chair.

In this embodiment the load applied to the seat is supported by a sheet of open mesh 38 which is secured to the upper edge of a generally rectangular wall or frame 39 embedded within the foam plastic seat 31. The lower edge of the frame 39 is secured to a strip 40 which is attached to the base 33 and serves to support the rectangular frame.

The mesh 38 has an open construction and may be formed of wire, fabric, netting or the like, and is firmly secured at its margin or periphery to the upper edge of the frame 39. As best shown in FIG. 8, the mesh 38 is not stretched across the frame 39, but is provided with a substantial amount of slack so that in the normal position the mesh has a generally convex shape with the central portion of the sheet of mesh being displaced upwardly. When a load is applied to the seat, as shown by the phantom lines in FIG. 8, the mesh will be deformed through a generally horizontal position to a concave position. With the mesh in a concave position it will then support the load applied to the seat.

As the mesh is bonded to the foam plastic it will also tend to distribute the load more uniformly throughout the entire seat area.

In fabricating the chair shown in FIGS. 8 and 9 the rectangular internal frame 39 is secured to the base 33 and the entire skeleton is then inserted within the mold 21. As the mesh 38 is provided with a degree of slack, it will tend to flex downwardly when suspended in the mold. The liquid foam plastic is then introduced into the mold, as described in the first embodiment, and after the foam plastic has been cured, the mesh will be held in the convex position shown in FIG. 8 when the chair is righted.

The chair shown in FIGS. 8 and 9 is a very simple construction which can be readily fabricated in a single molding operation. The foam plastic itself will not support a load, and thus the sheet of mesh which is bonded to the foam plastic not only serves to distribute the load applied to the seat but will be deformed by the load from the convex shape to a concave shape where it will then support the load applied to the seat.

While the above description is directed to the fabrication of the chair, it is contemplated that a sofa or other article of furniture can be fabricated in a like manner.

Various modes of carrying out the invention are contemplated as being within the scope of the following claims particularly pointing out and distinctly claiming the subject matter which is regarded as the invention.

I claim:

1. In an article of furniture, a seat portion formed of foam plastic material, a frame to support the seat and having a portion embedded within the seat, and a sheet of open mesh secured to the portion of the frame embedded within the seat and bonded to said foam plastic material and normally having a generally upwardly convex contour, said sheet of mesh tending to deform through a horizontal plane to a generally concave position when a load is applied to the seat to thereby support and distribute the load applied to the seat.

2. In an article of furniture, a seat formed of foam plastic material, a base to support the seat, a sheet of open mesh material embedded within the seat and bonded to said foam plastic material and being substantially coextensive with the upper surface of the seat, and means connected to the base and embedded within the seat for supporting the periphery of said open mesh, said mesh normally having a generally upwardly convex shape and adapted to be deformed to a generally concave shape when a load is applied to the seat with the concave mesh thereby serving to support the load.

3. In an article of furniture, a seat formed of foam plastic material, a base to support the seat, a sheet of open mesh material embedded within the seat and bonded to said foam plastic material and being substantially coextensive with the upper surface of the seat, and means connected to the base and embedded within the seat for supporting at least a portion of the periphery of the mesh with the central portion of the mesh being free of support from said means, said mesh being disposed in a generally slack condition and serving to initially distribute the load applied to the seat and being deformed by the load to a generally taut condition whereby the mesh functions to support the load.

4. A load supporting structure, comprising a frame, a seat formed of foam plastic material and supported by the frame and having a load supporting surface, and a sheet of reinforcing material having a plurality of surface interruptions embedded within the seat and bonded to the foam plastic material, said sheet being disposed substantially coextensive with the load supporting surface and having spaced portions of the periphery of the sheet connected to the frame, said sheet being disposed in a slack condition and serving to initially distribute the load applied to the seat and being deformed by the load to a generally taut condition whereby the sheet functions to support the load.

5. A load supporting structure, comprising a frame, a foam plastic seat supported by the frame and having a load supporting surface, a sheet of open mesh reinforcing material embedded within the seat and bonded to the foam plastic, said sheet being generally parallel to the load supporting surface and having a generally upwardly convex shape, and means for connecting spaced portions of the periphery of the sheet to the frame, said sheet adapted to be deformed to a generally concave shape when a load is applied to the seat with the concave shape thereby supporting the load.

6. A load supporting structure, comprising a frame, a seat formed of foam plastic material and supported by the frame and having a load supporting surface, a sheet of non-resilient reinforcing material having a plurality of surface interruptions embedded within the seat and bonded to the foam plastic material, said sheet being disposed substantially parallel with the load supporting surface and being attached to spaced portions of the frame, said sheet having a substantially greater length than the distance between said spaced portions of the frame so that said sheet is in a slack condition and serves to initially distribute the load applied to the seat and being deformed by the load to a generally taut condition whereby the seat functions to support the load.

*7. A load supporting structure, comprising a frame, a foam plastic cushion supported by the frame and having a load supporting surface, a reinforcing means embedded within the cushion and bonded to the foam plastic, said reinforcing means being disposed in a generally corrugated pattern to provide a series of ridges and valleys, said corrugated pattern tending to straighten out as a load is applied to said load supporting surface to thereby stretch and distort the portion of the foam plastic between said ridges and valleys to resist the load and distribute the load.*

*8. A load supporting structure, comprising a frame, a foam plastic cushion supported by the frame and having a load supporting surface, a flexible sheet-like reinforcing member embedded within the cushion and bonded to the foam plastic, said member having at least one generally V-shaped bend extending out of a plane parallel to the load supporting surface, said bend being disposed to straighten out when a load is applied to the load supporting surface to thereby stretch and distort the foam plastic in the bent area and provide a resistance to the load.*

*9. A load supporting structure, comprising a frame, a foam plastic cushion supported by the frame and having a load supporting surface, reinforcing means embedded within the cushion and bonded to the foam plastic, said reinforcing means including a first portion having a generally corrugated pattern and having a second portion including means transverse to said first portion and in engagement therewith, said corrugated pattern being capable of straightening out as a load is applied to said load supporting surface to thereby stretch and distort the foam plastic within said corrugated pattern, and said second portion maintaining its shape as originally established in relation to the corrugated pattern as the load is applied and thereby distributing the load throughout the corrugated pattern as the load is applied to the load supporting surface.*

References Cited by the Examiner

The following references, cited by the Examiner, are of record in the patented file of this patent or the original patent.

UNITED STATES PATENTS

| | | | |
|---|---|---|---|
| 2,309,570 | 1/1943 | Borisch | 5—353 |
| 2,771,126 | 11/1956 | Stoll | 297—421 |
| 2,775,287 | 12/1956 | Montegna | 5—351 |
| 2,838,100 | 6/1958 | Follows | 297—418 X |
| 2,942,652 | 6/1960 | Chapman | 297—458 |
| 2,976,916 | 3/1961 | Schladermundt et al. | 297—458 |
| 2,980,167 | 4/1961 | Harris | 267—1 |
| 3,047,888 | 8/1962 | Schecter et al. | 5—361 |
| 3,069,701 | 12/1962 | McInerney | 297—11 |
| 3,082,486 | 3/1963 | Khawam et al. | 264—45 |
| 3,083,056 | 3/1963 | Ward | 297—11 |
| 3,112,987 | 12/1963 | Griffiths | 297—11 |
| 3,116,196 | 12/1963 | Terry | 297—11 |

FOREIGN PATENTS

| | | |
|---|---|---|
| 1,082,184 | 6/1954 | France. |
| 388,472 | 3/1933 | Great Britain. |

FRANK B. SHERRY, *Primary Examiner.*

GEORGE L. BREHM, *Examiner.*

R. D. KRAUS, C. A. NUNBERG, *Assistant Examiners.*